| United States Patent [19] | [11] Patent Number: 4,601,220 |
|---|---|
| Yurick, Jr. | [45] Date of Patent: Jul. 22, 1986 |

[54] SKI EDGE TUNING TOOL

[76] Inventor: Stephen J. Yurick, Jr., P.O. Box 276, R.D. #3, Phoenixville, Pa. 19460

[21] Appl. No.: 650,074

[22] Filed: Sep. 13, 1984

[51] Int. Cl.⁴ .................. B21K 17/00; B23D 67/12
[52] U.S. Cl. ............................................ 76/83; 29/80
[58] Field of Search ...................... 76/83, 82, 88, 82.1, 76/82.2; 29/78, 80; 51/205 WG, 214; 30/169; 280/809

[56] References Cited

U.S. PATENT DOCUMENTS

| 978,356 | 12/1910 | Chaille | 76/82.1 |
|---|---|---|---|
| 3,621,571 | 11/1971 | Gern | 30/169 |
| 3,968,345 | 7/1976 | Kollmeder | 29/80 |
| 3,991,429 | 11/1976 | Honauer | 76/83 |
| 4,089,076 | 5/1978 | Sparling | 29/80 |
| 4,121,484 | 10/1978 | Gorlach et al. | 76/83 |
| 4,241,624 | 12/1980 | Strojny | 76/83 |
| 4,280,378 | 7/1981 | Levine | 76/83 |

Primary Examiner—Roscoe V. Parker
Attorney, Agent, or Firm—Saidman, Sterne, Kessler & Goldstein

[57] ABSTRACT

An improved ski edge sharpening device is shown which features a body portion having first and second recesses. The first recess is adapted to retain a file at a predetermined angle to a bottom surface of the tool adapted to slide against the bottom surface of the ski, and the second recess holds a magnet of substantially the same length as the file for attracting and retaining ferrous filings generated during sharpening the ski, such that the fillings do not interfere with the filing operation and do not abrade the delicate bottom surface of the ski.

8 Claims, 5 Drawing Figures

SKI EDGE TUNING TOOL

FIELD OF THE INVENTION

This invention relates to the field of tools for sharpening the edges of skis.

BACKGROUND OF THE INVENTION

It is well understood by those who ski that turning is effected by urging the sharpened edges, at which the bottom surfaces of the skis meet their substantially vertical side surfaces, into the snow or ice, by shifting one's weight. It is further understood that to turn efficiently, the ski edges must be kept sharp, free of bumps and digs, and that it is desirable that the edges be as perpendicular to the bottom as possible. Typically the skis are manufactured out of fiberglass materials, sometimes laminated with other materials, and the edges are formed by steel strips typically on the order of ⅛ by ¼ inches high and wide respectively, integrally molded into the skis to form their edges. It is common practice to sharpen or "tune" these edges by filing them square prior to a skiing outing.

It is difficult to obtain accurately square edges by simple hand filing. Accordingly, the prior art shows several tools for achieving this purpose. However, none of these are as efficient nor as well designed as would be desired. The prior art tools have flat bottoms which ride on the bottom surfaces of the ski and comprise a file integrally mounted in the body of the tool to achieve the proper angle. See, for example, Gorlach et al U.S. Pat. No. 4,121,484. This patent shows retention of the file in the body of the tool by a magnet affixed to the body of the tool. This has the extremely significant defect that the steel particles removed in filing will tend to be attracted to the magnet and then be ground into the very delicate bottom surface of the ski. Skis are now being made of very "high tech" materials which the steel filings can readily damage, and which tend to retain the filings. Of course, this greatly interferes with their function of substantially friction-free sliding over snow. Kollmeder U.S. Pat. No. 3,968,345 shows a tool combining waxing and filing functions. Another patent which is relevant generally to this subject matter is Strojny U.S. Pat. No. 4,241,624, which shows a tool having a generally ¾ circular cross section with a file formed therein. This tool is unduly cumbersome to use and does not provide any positive means of removing the filings such that they are not ground into the bottom surface of the ski. Other relevant patents in this area are Sparling U.S. Pat. No. 4,089,076, and Gern U.S. Pat. No. 3,621,571. Neither of these show any positive means of removing the filings from the region of the file.

OBJECTS OF THE INVENTION

Accordingly, it is an object of the invention to provide an improved ski edge tuning tool which includes positive means for removing the filings away from the file surface so that they are not urged into the delicate bottom surface of the ski.

Another object of the invention is to provide a simplified ski edge tuning tool which is relatively inexpensive of construction yet fool-proof in operation, and which is relatively easy to use.

SUMMARY OF THE INVENTION

The invention herein satisfies the needs of the art and objects of the invention mentioned above by its provision of an improved ski edge tuning tool in which a magnet is disposed in a recess formed in the surface of the tuning tool body which slides over the bottom surface of the ski, and in which the body defines a second recess for receiving a file, shaped to ensure that the file stays perpendicular to the bottom surface of the tool. In this way, the edge of the ski is filed perfectly perpendicular to its bottom surface, while the magnet removes filings from the file area, ensuring that the filings do not abrade the bottom surface of the ski nor become embedded therein. Removal of the filings also allows the file to cut smoother, generating a better edge, and ensures that it never hesitates when urged into engagement with the steel edge of the ski.

BRIEF DESCRIPTION OF THE DRAWINGS

The invention will be better understood if reference is made to the accompanying drawings in which.

DESCRIPTION OF THE PREFERRED EMBODIMENTS

Figure 2:
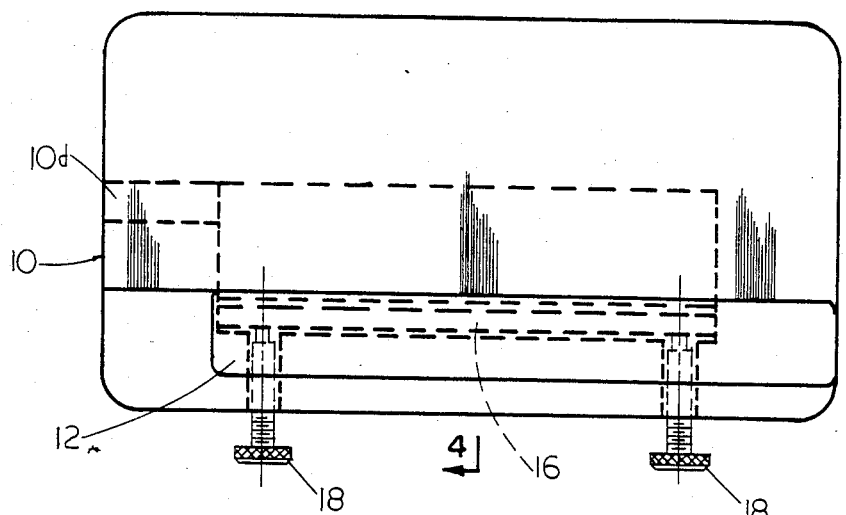
FIG. 2 shows a top view of the tuning tool of the invention.
Figure 1:
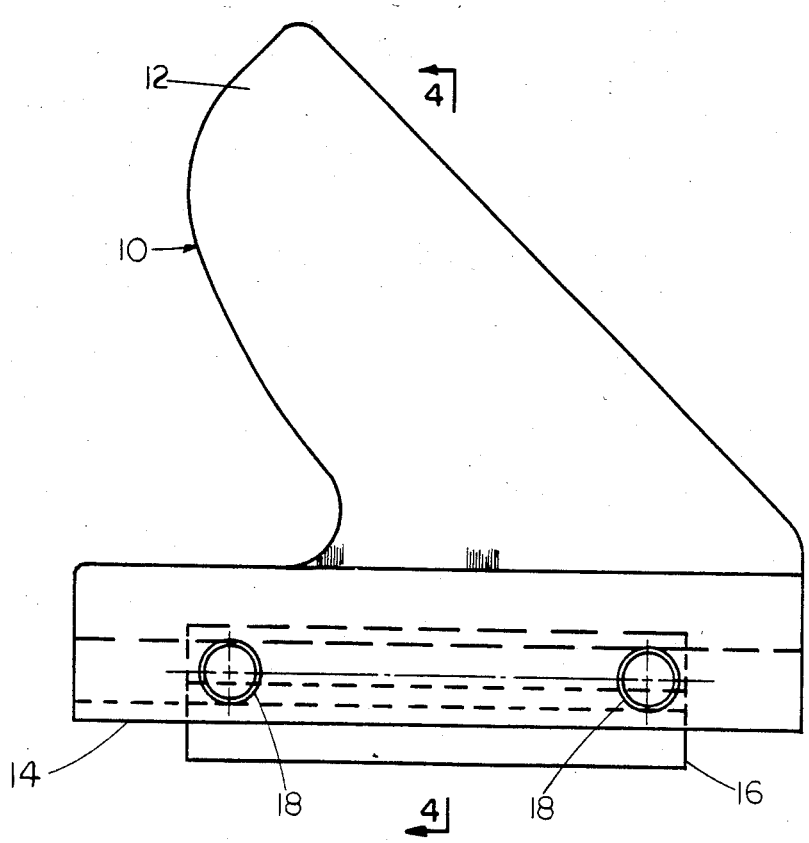
FIG. 1 shows a side view of the ski edge tuning tool according to the invention.
Figure 4:
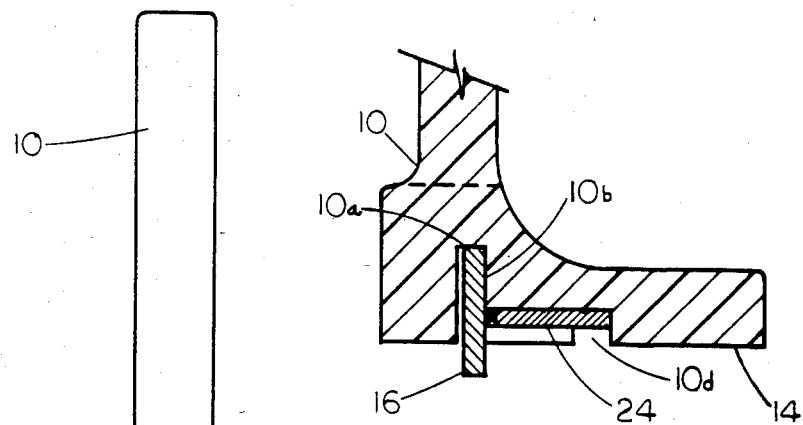
FIG. 4 is a cross-section taken along the lines 4—4 of FIGS. 1 and 2.
Figure 3:
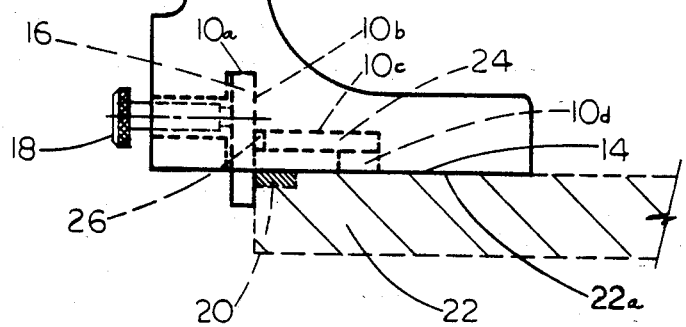
FIG. 3 is an end view of the ski edge tuning tool according to the invention.

FIGS. 1, 2 and 3 show the ski edge tuning tool according to the invention, and FIG. 3 additionally shows in phantom a ski in position to be sharpened with the tuning tool of the invention. The tool comprises a body portion 10 which in a preferred embodiment may be molded integrally of a fiber reinforced plastic material, aluminum or any similarly durable, inexpensively moldable material. The tool is formed with an upstanding handle portion 12 and a body portion having a flat bottom 14 essentially perpendicular to the handle portion 12 for ease of operation. A recess 10a is formed in the body portion 10 and it comprises at least one surface 10b which is precisely perpendicular to the bottom surface 14. A file 16 is held firmly against surface 10b by a number of thumb screws 18. In this way, the angle formed by the portion of the file 16 which protrudes beneath the bottom surface 14 is precisely perpendicular thereto such that when the surface 14 is juxtaposed to the bottom of a ski and the file 16 is used to square up the edge of the steel insert 20 of the ski 22, as shown in phantom in FIG. 3, the angle formed is precisely 90° in accordance with the objects of the invention mentioned above.

When the file 16 is used to file down the edge of the steel insert 20, filings are of course generated. According to the prior art, no provision was made for ensuring that these filings were not trapped between the bottom surface 14 of the tool and the bottom surface 22a of the ski. Clearly, the condition of the bottom surface 22a of the ski 22 is critical, in that it must be smooth and friction-free, so that the ski can slide smoothly over the snow. According to one aspect of the present invention, a magnet 24 is inserted in a second recess 10c in the body portion 10. This magnet 24 attracts the steel filings and keeps them well away from the bottom surface 22a of the ski. As shown, the magnet 24 is recessed somewhat from the bottom surface 14 of the tool 10 in order to allow a substantial amount of the filings to accumulate before any interference therebetween occurs.

In a preferred embodiment, a thin, e.g. 1/16 inch layer of rubber strip 26 is interposed between the file and the magnet to ensure proper retention of these parts.

One end of the tool may be provided with a clean-out notch 10d through which filings adhering to the magnet can be brushed to remove them.

Provision of the magnet 24 to attract the filings from the steel edge 20 of the ski provides several advantages in operation. Perhaps primary among these is that previously discussed, i.e. that the filings are prevented from damaging the lower surface 22a of the ski which is critical to its performance. The magnet also prevents the filings from being stuck in the grooves of the file, preventing it from loading up, which ensures good cutting efficiency, so that the time required to sharpen edges using the tool of the invention is not too time consuming. Further, it means the finish provided is smooth and chatter free.

Figure 5:
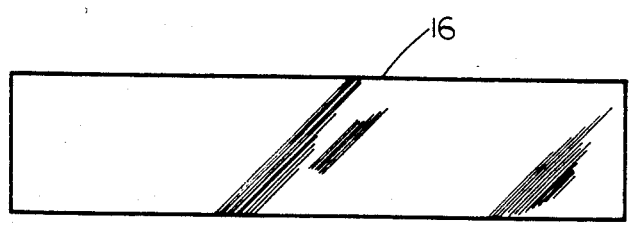
FIG. 5 shows the file.

It will be appreciated that the tool of the invention can be manufactured relatively simply using standard materials such as a standard file 16 shown in FIG. 5; an ordinary bastard cut mill file is suitable for this application. Similarly, the magnet is not particularly critical though it is desirable that the magnet's length be at least equal to that of the file to ensure that no filings escape its magnetic field. Similarly, the material from which the body 10 of the tool is made can be any material which is suitably durable and readily moldable, such as fiber reinforced plastics or possibly aluminum. Manufacture of the device is relatively simple. It would comprise a simple casting or molding step followed by machining to ensure the precise 90° relationship of at least one wall of the recess and the bottom surface 14, drilling and tapping for the thumb screws 18 or adaption to an equivalent file confinement device, possibly machining of the recess for the magnet, and assembly.

It will also be appreciated that other embodiments of the invention will occur to those skilled in the art and these are within the scope of the invention as well. These improvements might include a two-handed tool, in which handles would be provided for both the user's hands. The overall tool would then be somewhat longer. Other possibilities would include incorporation of some of the other ski tool improvements shown in the prior art referred to above, e.g. such as automatic waxing devices or the like.

Finally, it will be appreciated by those skilled in the art that while the 90° angle between ski edge and bottom emphasized above is now usual, it might be desirable to provide skis in which this angle departed somewhat from the perpendicular, for any of a wide variety of reasons, and that tools to maintain the ski edges at any desired angle from the bottom surface of the ski are within the claims of this application. Clearly the only change required would be to vary the angle of the wall 10b of the recess 10a against which the file is confined.

Therefore, while a preferred embodiment of the invention has been shown and described, the invention is not to be limited thereto but only by the following claims.

I claim:

1. A tool for sharpening the edges of skis comprising:
   a body portion having a handle portion and a flat bottom surface portion designed to slide over the bottom surface of a ski;
   means for retaining a file in fixed relation and at substantially right angles to said bottom surface portion of said body portion; and
   a magnet retained in a recess in said bottom surface and juxtaposed to said file such that ferrous filings from filing edges of skis are attracted to and retained by said magnet,
   wherein said recess is sufficiently deeper than the thickness of the magnet that clearance is provided between the surface of the magnet and a ski juxtaposed to the bottom surface of said tool when in use, and said recess further includes a cleaning recess formed in the bottom surface of the tool away from the file.

2. The tool of claim 1 wherein said file is substantially rectangular and is confined within a slot formed in the body portion of said tool and substantially perpendicular to said bottom surface portion thereof.

3. The tool of claim 2 wherein said means retaining said file comprise one or more thumb screws interacting with threaded holes formed in said body portion and adapted to be tightened so as to urge the file into engagement with an opposing wall of said slot.

4. The tool of claim 3 wherein said magnet is substantially rectangular and of substantially the same length as said file and is confined within a recess juxtaposed to the slot within which said file is retained.

5. A tool for sharpening the edges of skis such that the vertical edges of said skis form a predetermined angle with the bottom surfaces of the skis comprising:
   a body including a handle portion and a flat bottom surface and at least two recesses, a first one of said recesses being formed with at least one wall substantially at said predetermined angle to said bottom surface and the second of said recesses being juxtaposed thereto;
   a file fitting into said first recess;
   means retaining said file within said first recess; and
   a magnet retained within said second recess and juxtaposed to said file in said first recess, whereby filings generated by filing edges of skis are attracted to and retained by said magnet,
   wherein the second recess into which said magnet fits it sufficiently deep that clearance is provided between the surface of said magnet and a ski to which said bottom surface is juxtaposed in use, and wherein said second recess includes a cleaning recess formed in the bottom surface away from the file.

6. The tool of claim 5 wherein said means retaining said file in said first recess is one or more thumb screws fitting into threaded holes formed in the body of said tool to urge said file into engagement with said wall of said recess at substantially said predetermined angle to said bottom surface.

7. The tool of claim 6 wherein said magnet and said file are both substantially rectangular and have substantially the same length.

8. The tool of claim 5 wherein said predetermined angle is substantially 90°.

* * * * *